United States Patent
Li et al.

(10) Patent No.: US 9,860,842 B2
(45) Date of Patent: Jan. 2, 2018

(54) DATA PROCESSING METHOD, TERMINAL, SUBSCRIBER IDENTITY MODULE CARD, AND SYSTEM

(71) Applicant: ZTE CORPORATION, Shenzhen, Guangdong Province (CN)

(72) Inventors: Xipeng Li, Shenzhen (CN); Jun Li, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 14/900,176

(22) PCT Filed: Sep. 27, 2013

(86) PCT No.: PCT/CN2013/084477
§ 371 (c)(1),
(2) Date: Dec. 21, 2015

(87) PCT Pub. No.: WO2014/205941
PCT Pub. Date: Dec. 31, 2014

(65) Prior Publication Data
US 2016/0150478 A1   May 26, 2016

(30) Foreign Application Priority Data
Jun. 24, 2013   (CN) .......................... 2013 1 0254928

(51) Int. Cl.
*H04W 52/02* (2009.01)
*H04W 8/22* (2009.01)
*H04M 1/725* (2006.01)

(52) U.S. Cl.
CPC ... *H04W 52/0251* (2013.01); *H04M 1/72569* (2013.01); *H04W 8/22* (2013.01); *H04W 52/028* (2013.01); *Y02B 60/50* (2013.01)

(58) Field of Classification Search
CPC ..... H04W 8/22; H04W 52/028; H04W 52/00; H04W 52/02; H04W 52/0209
(Continued)

(56) References Cited

U.S. PATENT DOCUMENTS

| | | | |
|---|---|---|---|
| 2011/0151930 A1* | 6/2011 | Lee | H04B 1/3816 455/558 |
| 2016/0134316 A1* | 5/2016 | Mohan | H04W 8/22 455/558 |
| 2016/0142891 A1* | 5/2016 | Virhia | G06Q 10/00 340/870.07 |

FOREIGN PATENT DOCUMENTS

| CN | 102801846 A | 11/2012 |
|---|---|---|
| CN | 103024183 A | 4/2013 |

(Continued)

*Primary Examiner* — Inder Mehra
(74) *Attorney, Agent, or Firm* — Ling Wu; Stephen Yang; Ling and Yang Intellectual Property

(57) ABSTRACT

A method for processing data, a terminal, a subscriber identity module card and a system are disclosed. The method includes: when a terminal is in a dormant state, keeping providing a working power supply for a subscriber identity module card and a specified electronic device within the terminal, so that the subscriber identity module card and the specified electronic device keep in a working state; the subscriber identity module card collecting working data of the specified electronic device and then storing the working data; and when the terminal quits from the dormant state, the terminal extracting the working data.

7 Claims, 4 Drawing Sheets

(58) Field of Classification Search
USPC ............... 455/574, 418, 550, 456.1; 370/311
See application file for complete search history.

(56) References Cited

FOREIGN PATENT DOCUMENTS

| NL | WO 01/63316 | * | 8/2001 | ............... G01S 5/14 |
| WO | 0163316 A1 | | 8/2001 | |
| WO | WO0163316 A1 | * | 8/2001 | |
| WO | WO2009151753 A2 | | 12/2009 | |

* cited by examiner

DATA PROCESSING METHOD, TERMINAL, SUBSCRIBER IDENTITY MODULE CARD, AND SYSTEM

TECHNICAL FIELD

The present document relates to the field of communication terminal technology, and particularly, to a method for processing data, a terminal, a subscriber identity module card and a system.

BACKGROUND OF THE RELATED ART

With the rapid development of the smartphone, the screen gets larger and larger, and the power consumption problem gradually becomes a bottleneck that restricts the development of the smart phone. How the smart phone saves the power consumption becomes a very important subject. Cellphone standby is a unique cellphone working state, and the power consumption of the cellphone is very low when the cellphone is in that working state. It is called standby when the cellphone works in a waiting state. The standby time refers to a continuous service time of the battery in the cellphone standby state, and it also can be explained as a time that can be maintained by the battery depending on its own consumption until a low power alarm occurs when the cellphone is fully charged and in the standby state of no call and not power off.

At present, the application scenarios in which the power consumption of the cellphone is higher mainly include: video playing, Global Positioning System (GPS) navigation, large games, calls and networking and so on. It can be seen that, in most of cellphone applications, the working state of a processor of the cellphone decides how much the power consumption is, that is, when the processor of the cellphone is in a heavy-load working state, the power consumption of the cellphone is very high, but when the cellphone enters the standby state, the processor of the cellphone enters a dormant state, and most of the above applications will all be closed, and it can be seen that the standby state is a very power-saving mode of the cellphone, thus how to solve a contradiction between the cellphone working time and the cellphone standby time becomes very important for the power saving of the cellphone.

SUMMARY

The embodiments of the present document provide a method for processing data, a terminal, a subscriber identity module card and a system, to solve a contradiction between the cellphone working time and the cellphone standby time.

The embodiment of the present document provides a method for processing data, which comprises:

when a terminal is in a dormant state, keeping providing a working power supply for one or more subscriber identity module cards and one or more specified electronic devices within the terminal, so that the one or more subscriber identity module cards and the one or more specified electronic devices keep in a working state;

the subscriber identity module card collecting working data of the specified electronic device and then storing the working data; and when the terminal quits from the dormant state, extracting the working data.

The above method is further characterized in that: the subscriber identity module card collecting the working data of the specified electronic device and then storing the working data comprises:

the subscriber identity module card collecting the working data of the specified electronic device, storing the working data in a storage unit within the subscriber identity module card or a storage unit of the terminal, and setting a flag bit.

The above method is further characterized in that: the method further comprises: when the terminal quits from the dormant state, and after extracting the working data, the terminal clearing the working data stored in the storage unit within the subscriber identity module card or the storage unit of the terminal, and restoring the set flag bit.

The above method is further characterized in that: the specified electronic device comprises a sensor and/or a camera, if the specified electronic device is the sensor, the subscriber identity module card communicates with the sensor via a single wire transmission protocol interface, and collects working data of the sensor.

The embodiment of the present document further provides a terminal, which comprises: a power supply unit, a subscriber identity module card and a processor, wherein:

the power supply unit is configured to: when in a dormant state, keep providing a working power supply for the subscriber identity module card and a specified electronic device;

the subscriber identity module card is configured to: collect working data of the specified electronic device and then store the working data; and the processor is configured to: when quitting from the dormant state, extract the working data of the specified electronic device collected by the subscriber identity module card.

The above terminal is further characterized in that:

the subscriber identity module card is configured to collect the working data of the specified electronic device and then store the working data by means of:

collecting the working data of the specified electronic device, storing the working data in a storage unit within the subscriber identity module card or a storage unit of the terminal, and setting a flag bit.

The processor is further configured to: after extracting the working data, clear the working data stored in the storage unit within the subscriber identity module card or the storage unit of the terminal, and restore the flag bit set by the subscriber identity module card.

The embodiment of the present document further provides a subscriber identity module card, which is located in a terminal, and comprises: a detection module and a collection module, wherein:

the detection module is configured to: when detecting that the terminal enters a dormant state, notify the collection module to keeping in a working state; and the collection module is configured to: after receiving a notification, collect working data of a specified electronic device and then store the working data.

The above subscriber identity module card is further characterized in that:

the collection module is further configured to: after storing the working data, set a flag bit.

The embodiment of the present document further provides a system for processing data, which comprises: the above terminal and the above subscriber identity module card.

The above system is further characterized in that:

when a specified electronic device in the terminal is a sensor, the subscriber identity module card communicates with the sensor via a single wire transmission protocol interface, and collects working data of the sensor.

In conclusion, through a method for processing data, a terminal, a subscriber identity module card and a system provided in the embodiments of the present document, the contradiction between the cellphone working time and the cellphone standby time can be solved, and when the terminal is dormant, it enables the related electronic device to keep in a working state without awakening a processor of the cellphone, which implements that the processor of the cellphone can keep in a dormant state for a longer time, thereby extending the service time of the cellphone, and improving the user experience.

PREFERRED EMBODIMENTS OF THE INVENTION

The embodiments of the present document will be described in detail in combination with the accompanying drawings below. It should be noted that the embodiments in the present document and the characteristics in the embodiments can be optionally combined with each other in the condition of no conflict.

Figure 1:
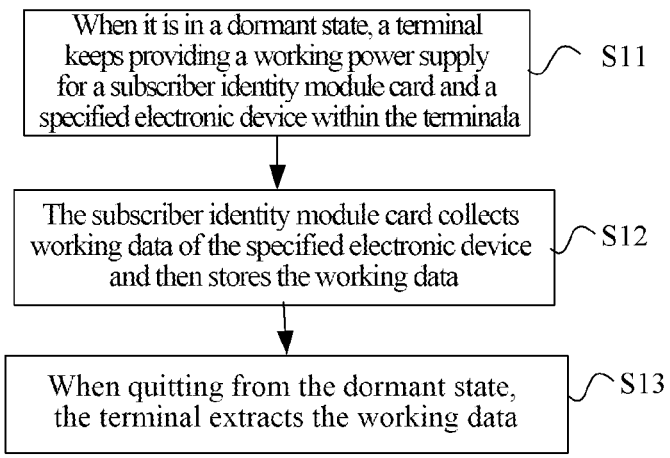
FIG. 1 is a flow chart of a method for a terminal processing data according to the embodiment of the present document.
Figure 2:
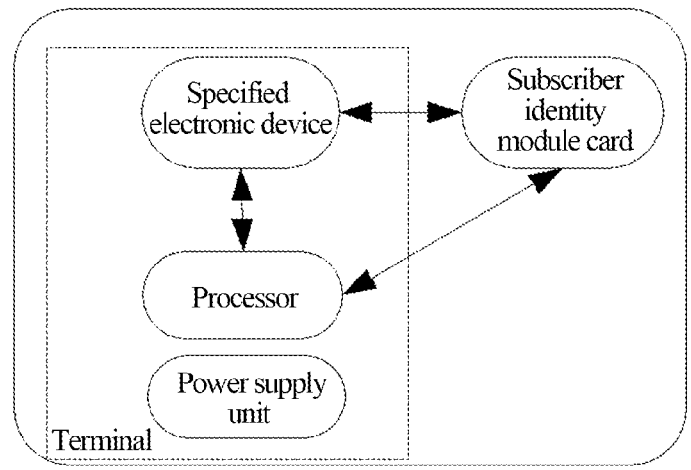
FIG. 2 is a schematic diagram of a system for processing data according to the embodiment.

FIG. 1 is a flow chart of a method for a terminal processing data according to the embodiment of the present document, and FIG. 2 is a schematic diagram of a system for processing data according to the embodiment. As shown in FIG. 1, the method of the embodiment can include the following steps.

In step S11, when it is in a dormant state, the terminal keeps providing a working power supply for a subscriber identity module card and a specified electronic device within the terminal, so that the subscriber identity module card and the specified electronic device keep in a working state.

In step S12, the subscriber identity module card collects working data of the specified electronic device and then stores the working data.

In step S13, when quitting from the dormant state, the terminal extracts the working data.

Therefore, according to the method of the embodiment of the present document, when the terminal is dormant, it enables the related electronic device to keep in a working state without awakening a processor of the cellphone, which implements that the processor of the cellphone can keep in a dormant state for a longer time, thereby extending the service time of the cellphone, and improving the user experience.

Figure 3:
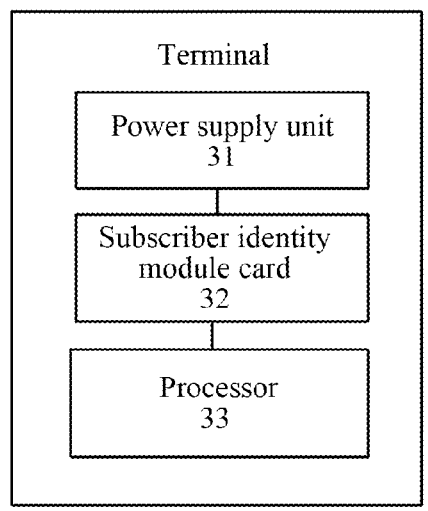
FIG. 3 is a schematic diagram of a terminal according to the embodiment of the present document.

FIG. 3 is a schematic diagram of a terminal according to the embodiment of the present document, and as shown in FIG. 3, the terminal of the embodiment includes:

a power supply unit 31, used to: when it is in a dormant state, keep providing a working power supply for a subscriber identity module card and a specified electronic device;

a subscriber identity module card 32, used to: collect working data of the specified electronic device and then store the working data; and a processor 33, used to: when quitting from the dormant state, extract the working data of the specified electronic device collected by the subscriber identity module card.

Wherein, the subscriber identity module card 32 is used to collect the working data of the specified electronic device and then store the working data by means of:

collecting the working data of the specified electronic device, storing the working data in a storage unit within the subscriber identity module card or a storage unit of the terminal, and setting a flag bit.

The processor 33 is also used to: after extracting the working data, clear the working data stored in the storage unit within the subscriber identity module card or the storage unit of the terminal, and restore the flag bit set by the subscriber identity module card.

Figure 4:
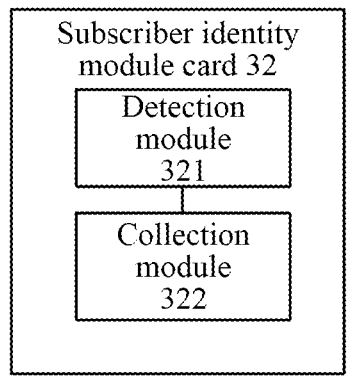
FIG. 4 is a schematic diagram of a subscriber identity module card according to the embodiment of the present document.

FIG. 4 is a schematic diagram of a subscriber identity module card according to the embodiment of the present document, and as shown in FIG. 4, the subscriber identity module card 32 of the embodiment includes:

a detection module 321, used to: when detecting that the terminal enters a dormant state, notify a collection module to keep in a working state; and the collection module 322, used to: after receiving a notification, collect working data of a specified electronic device and then store the working data.

Wherein, the collection module 322 is also used to: after storing the working data, set a flag bit.

The preferred embodiments of the present document will be described in combination with the accompanying drawings below. It should be understood that, the preferred embodiments described here are only used to explain and illustrate the present document, but they are not used to limit the present document.

Embodiment 1

With the rapid development of the smartphone, more and more sensors are integrated in the cellphone at present, the variety of sensors of the cellphone is also increasing, including: a gravity acceleration sensor, a compass sensor, a proximity sensor and an ambient light sensor and so on, and new-type applications brought by the sensors come forth continuously, thus the user experience of the cellphone is greatly improved, for example, the ambient light sensor can perceive the ambient light intensity in real time, to implement a function of intelligently adjusting screen luminance. The sensors have become indispensable devices of the smartphone at present, and the common sensor-type applications include: the screen can be turned off during the call through a range sensor; the gravity acceleration sensor can perceive the angle of the cellphone, to implement the automatic screen rotation; and the light sensor can judge the ambient light intensity, to automatically adjust the luminance of the cellphone. However, in the related art, the operation of the sensor has to depend on the control of the processor of the cellphone, once the processor of the cellphone enters a dormant state, the sensor of the cellphone cannot continue the work. That is, when the sensor of the cellphone is in a working state, since the processor of the cellphone is also in the working state, this inevitably causes that the power consumption of the cellphone cannot be in an ideal state. The specified electronic device of the embodiment is a sensor, so that the cellphone will not stop working when in dormant.

Figure 5:
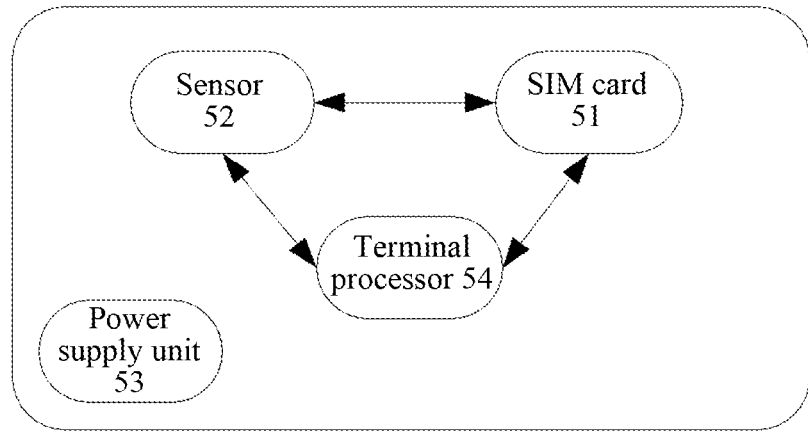
FIG. 5 is a schematic diagram of a system for processing data according to the embodiment 1 of the present document.

FIG. 5 is a schematic diagram of a system for processing data according to the embodiment, and the system of the terminal of the embodiment includes a Subscriber Identity Module (SIM) card 51, a sensor 52, a power supply unit 53 of the terminal, and a terminal processor 54.

The SIM card 51 collects data of the sensor via a Central Processing Unit (CPU) within the SIM card when the terminal is in a dormant state, and saves the data in the storage space within the SIM card, and sets a storage flag bit after the storage is successful;

the sensor 52 collects external data of the terminal and converts the data into data signals;

after the terminal ends the dormancy, the terminal processor 54 establishes communication with the SIM card, and collects the data stored within the SIM card, and after the data collection is successful, restores the flag bit set by the SIM card; and the power supply unit 53 supplies power for the electronic devices in the system, and when the terminal is dormant, keeps providing a working power supply for the SIM card 51 and the sensor 52.

The data collection is performed by using the CPU within the SIM card 51, and the data are saved in the storage space within the SIM card.

Figure 6:
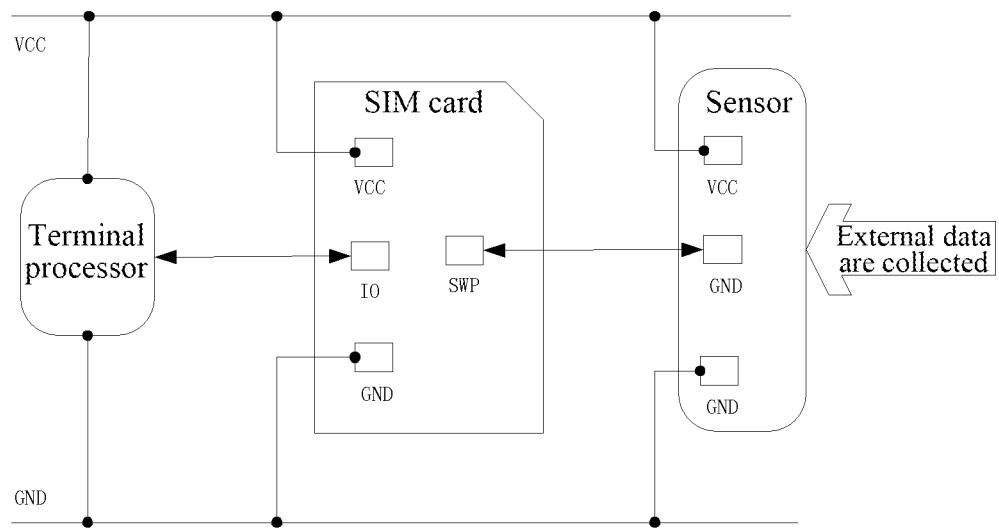
FIG. 6 is a circuit schematic diagram of a system for processing data according to the embodiment 1 of the present document.

FIG. 6 is a circuit schematic diagram of the system for processing data according to the embodiment, and as shown in FIG. 6, a power supply unit provides power source for the circuit components, an SIM card communicates with a sensor via a Single Wire Protocol (SWP) interface, and collects data in the sensor, and a terminal processor communicates with the SIM card after quitting from a dormant state and extracts the data saved within the SIM card.

Figure 7:
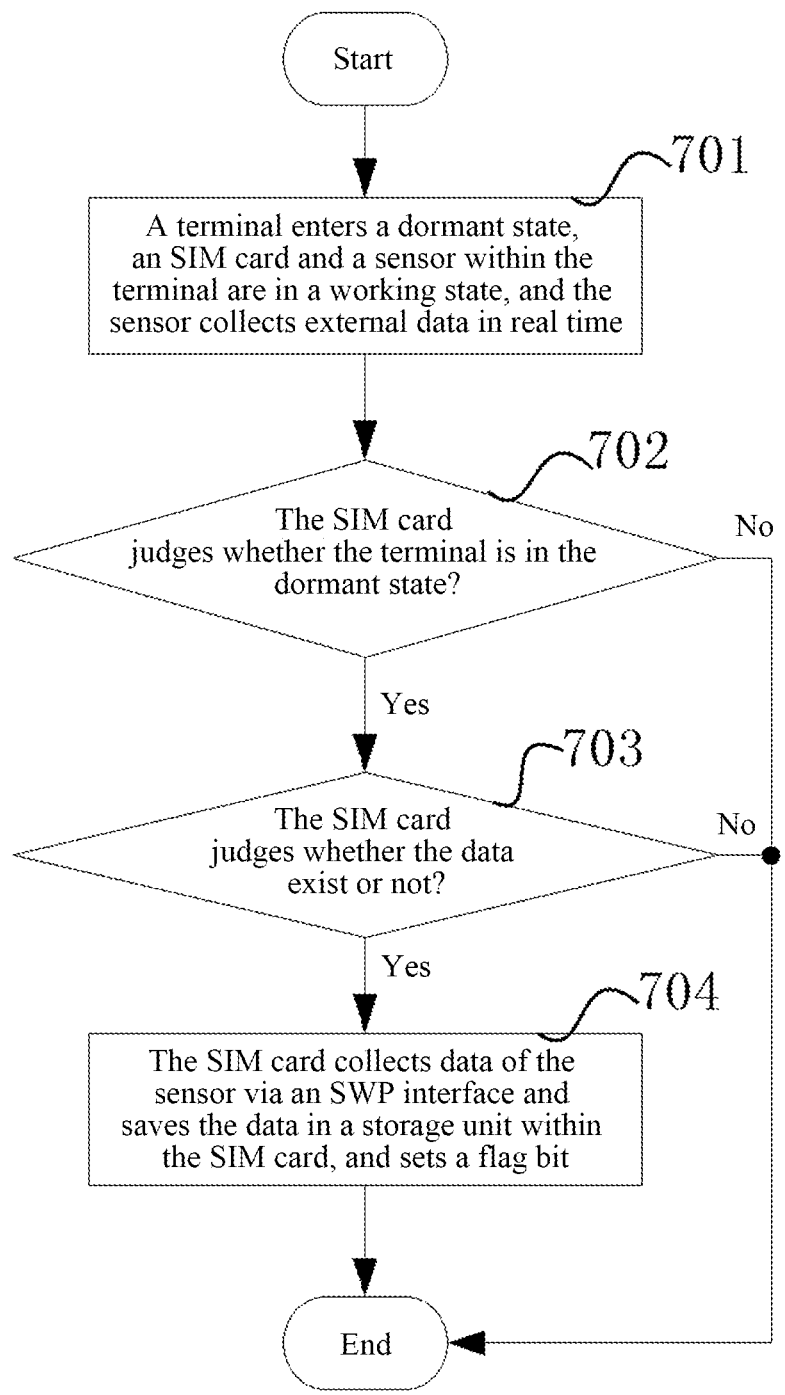
FIG. 7 is a flow chart of a terminal collecting data in a dormant state according to the embodiment 1 of the present document.

FIG. 7 is a flow chart of a terminal collecting data in a dormant state according to the embodiment, and the following steps are included.

In step 701, the terminal enters a dormant state, an SIM card and a sensor within the terminal are in a working state, and the sensor collects external data in real time.

In step 702, the SIM card detects whether the terminal enters the dormant state, if the terminal enters the dormant state, it is to proceed to step 703; and if the terminal does not enter the dormant state, the flow ends.

In step 703, the SIM card starts to periodically judge whether data are generated in the sensor, if data are generated in the sensor, it is to proceed to step 704; and if data are not generated in the sensor, the flow ends.

In step 704, the SIM card collects data of the sensor via an SWP interface and saves the data in a storage unit within the SIM card, and sets a flag bit. The role of the flag bit is to be provided to the terminal processor for judging whether the data from the sensor have been collected in the SIM card.

Figure 8:
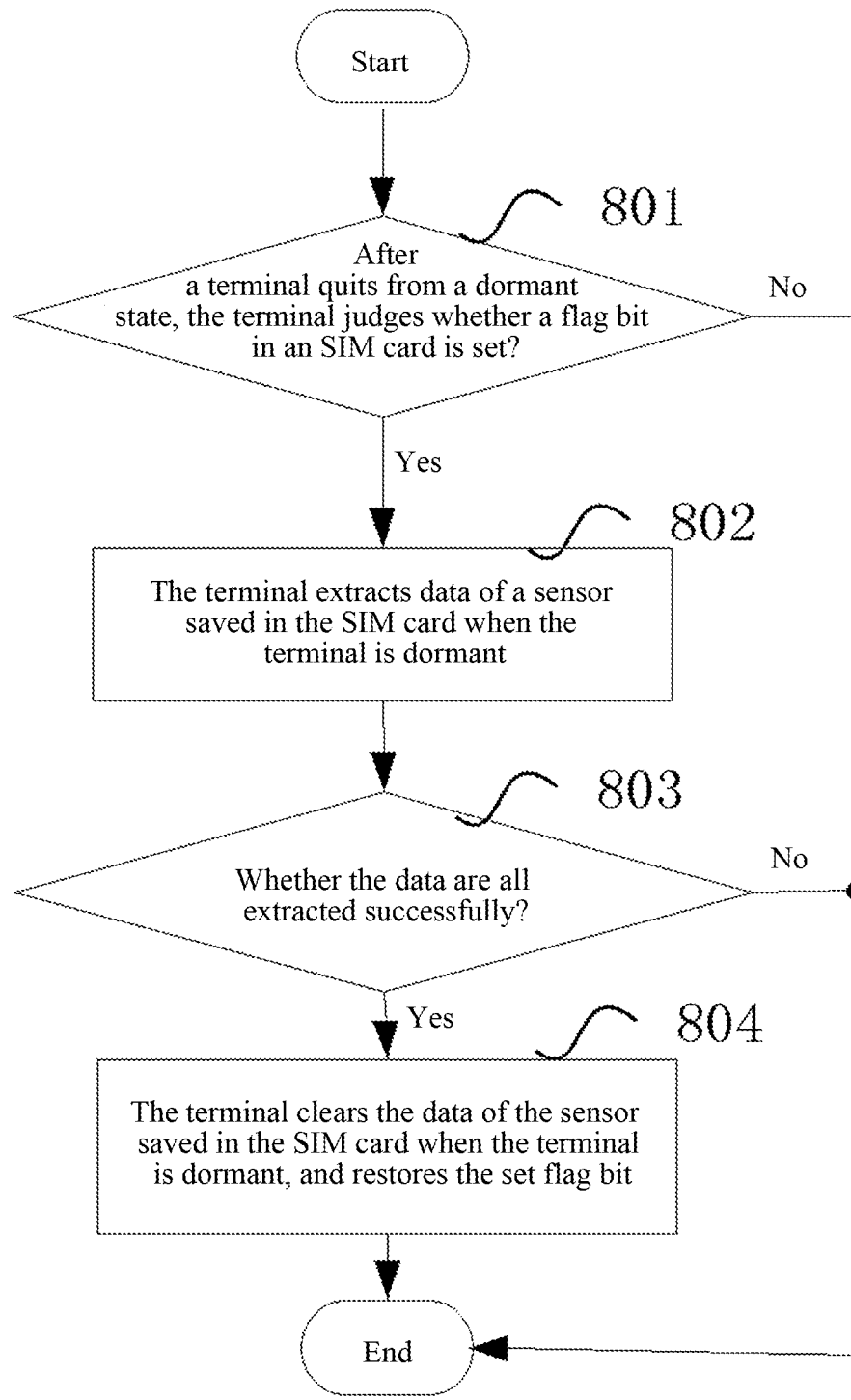
FIG. 8 is a flow chart of a terminal collecting data in a working state according to the embodiment 1 of the present document.

FIG. 8 is a flow chart of a terminal collecting data in a working state according to the embodiment, and the following steps are included.

In step 801, after the terminal quits from a dormant state, the terminal judges whether a flag bit in an SIM card is set, and if the flag bit is set, it indicates that data from a sensor have been collected in the SIM card, and it is to proceed to step 802; and if the flag bit is not set, the flow ends.

In step 802, the terminal extracts the data generated by the sensor and saved in the SIM card when the terminal is dormant at this point.

In step 803, the terminal judges whether the data are successfully extracted, and if the data are successfully extracted, it is to proceed to step 804, and if the data are not successfully extracted, the flow ends.

In step 804, the terminal clears the data generated by the sensor and saved in the SIM card when the terminal is dormant, and restores the set flag bit.

The subscriber identity module cards supported by the terminal include but are not limited to: an SIM card and a User Identity Model (UIM) card and so on, and identification cards that can perform user identity authentication are all within the protection scope of the present document.

Embodiment 2

The present document can be not limited to using the SIM card to control the sensor of the terminal, and the SIM card can be used to control other components in the terminal, such as a camera and a storage unit of the terminal and so on.

The system of the terminal of the embodiment can be composed of: a subscriber identity module card, a camera unit, a power supply unit, a terminal storage unit and a terminal processor and so on.

The subscriber identity module card collects data of the camera unit via a CPU within the subscriber identity module card when the terminal is in a dormant state, and saves the data in the terminal storage unit, and sets a storage flag bit after the storage is successful;

the camera unit collects external data of the terminal and converts the data into digital signals;

after the terminal ends the dormancy, the terminal processor establishes communication with the SIM card, and collects the data stored by the terminal storage unit, and after the data collection is successful, restores the set flag bit; and the power supply unit supplies power for the electronic devices in the system, and when the terminal is dormant, keeps providing a working power supply for the devices such as the subscriber identity module card, camera unit and terminal storage unit and so on.

The terminal enters the dormant state, the SIM card, camera unit and terminal storage unit are in the working state, and the camera unit collects the external data. The SIM card collects the data generated by the camera unit when the terminal is in the dormant state, and saves the data in the terminal storage unit, and sets the flag bit of the terminal after the storage is successful.

After the terminal quits from the dormant state, the terminal judges whether the flag bit is set, and if the flag bit is set, it indicates that data are generated in the dormant state. The processor of the terminal extracts the data generated by the camera unit and saved when the terminal is dormant from the storage unit of the terminal at this point. After the extraction is successful, the processor of the terminal clears the data, and restores the set flag bit.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or a plurality of integrated circuits. Correspondingly, each module/unit in the above embodiments can be implemented in a form of hardware, and also can be implemented in a form of software function module. The embodiment of the present document is not limited to any combination of hardware and software in a specific form.

The above description is only the preferred embodiments of the present document. Certainly, the present document can still have other various examples. The skilled people familiar to the art can make various corresponding changes and transformations according to the embodiments of the present document without departing from the spirit and essence of the embodiments of the present document, and these corresponding changes and transformations shall all fall into the protection scope of the appended claims of the present document.

INDUSTRIAL APPLICABILITY

With the technical scheme of the embodiment of the present document, a contradiction between the cellphone working time and the cellphone standby time can be solved, which implements that a processor of the cellphone can keep in a dormant state for a longer time, thereby extending the service time of the cellphone, and improving the user experience.

What is claimed is:

1. A method for processing data, comprising:
when a terminal is in a dormant state, keeping providing a working power supply for one or more subscriber identity module cards within the terminal and one or more specified electronic devices within the terminal, so that the one or more subscriber identity module cards and the one or more specified electronic devices keep in a working state;
the subscriber identity module card collecting working data of the specified electronic device and then storing the working data; and
when the terminal quits from the dormant state, extracting the working data;
wherein the specified electronic device comprises a sensor, or a camera, or a sensor and a camera,
if the specified electronic device is the sensor, the subscriber identity module card communicates with the sensor via a single wire transmission protocol interface, and collects working data of the sensor.

2. The method according to claim 1, wherein:
the working data of the specified electronic device collected by the subscriber identity module card is stored in a storage unit within the subscriber identity module card or stored in a storage unit of the terminal, and then a flag bit is set by the subscriber identity module card.

3. The method according to claim 2, further comprising:
when the terminal quits from the dormant state, and after extracting the working data, the terminal clearing the working data stored in the storage unit within the subscriber identity module card or the storage unit of the terminal, and restoring the set flag bit.

4. A terminal, comprising: a power supply unit, a subscriber identity module card and a processor, wherein:
the power supply unit is configured to: when the terminal is in a dormant state, keep providing a working power supply for the subscriber identity module card and a specified electronic device;
the subscriber identity module card is configured to: collect working data of the specified electronic device and then store the working data; and
the processor is configured to: when the terminal quitting from the dormant state, extract the working data of the specified electronic device collected by the subscriber identity module card;
wherein the specified electronic device comprises a sensor, or a camera, or a sensor and a camera,
if the specified electronic device is the sensor, the subscriber identity module card communicates with the sensor via a single wire transmission protocol interface, and collects working data of the sensor.

5. The terminal according to claim 4, wherein:
the working data of the specified electronic device collected by the subscriber identity module card is stored in a storage unit within the subscriber identity module card or stored in a storage unit of the terminal, and then a flag bit is set by the subscriber identity module card;
the processor is further configured to: after extracting the working data, clear the working data stored in the storage unit within the subscriber identity module card or the storage unit of the terminal, and restore the flag bit set by the subscriber identity module card.

6. A subscriber identity module card, located in a terminal, and comprising: a detection module and a collection module, wherein:
the detection module is configured to: when detecting that the terminal enters a dormant state, notify the collection module to keep in a working state; and
the collection module is configured to: after receiving a notification, collect working data of a specified electronic device and then store the working data;
wherein the specified electronic device comprises a sensor, or a camera, or a sensor and a camera,
if the specified electronic device is the sensor, the subscriber identity module card communicates with the sensor via a single wire transmission protocol interface, and collects working data of the sensor.

7. The subscriber identity module card according to claim 6, wherein:
the collection module is further configured to: after storing the working data, set a flag bit.

* * * * *